US012689749B2

(12) United States Patent (10) Patent No.: US 12,689,749 B2
Terzi et al. (45) Date of Patent: Jul. 21, 2026

(54) METHOD AND SYSTEM FOR EFFICIENT TRANSMISSION OF MONOCHROME VIDEO DATA, IN PARTICULAR FOR LASER BEAM SCANNING APPLICATIONS

(71) Applicant: STMicroelectronics International N.V., Geneva (CH)

(72) Inventors: Davide Terzi, Zanica (IT); Guy Amor, Gan-Yavne (IL); Stefano Brovelli, Invorio (IT); Lorenzo De Biasi, Prata di Pordenone (IT); Tomer Shkalim, Kfar Saba (IL)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/793,655

(22) Filed: Aug. 2, 2024

(65) Prior Publication Data

US 2025/0056020 A1 Feb. 13, 2025

(30) Foreign Application Priority Data

Aug. 8, 2023 (IT) ........................ 102023000016971

(51) Int. Cl.
H04N 19/186 (2014.01)
G06V 10/56 (2022.01)

(52) U.S. Cl.
CPC ........... H04N 19/186 (2014.11); G06V 10/56 (2022.01)

(58) Field of Classification Search
CPC combination set(s) only.
See application file for complete search history.

(56) References Cited

U.S. PATENT DOCUMENTS

| | | | |
|---|---|---|---|
| 10,721,470 B2 | 7/2020 | Foessel et al. | |
| 2001/0021971 A1* | 9/2001 | Gibson | H04N 19/42 |
| | | | 712/E9.067 |
| 2001/0048476 A1* | 12/2001 | Nakamura | H04N 23/88 |
| | | | 348/E9.053 |

(Continued)

FOREIGN PATENT DOCUMENTS

| | | |
|---|---|---|
| CN | 112135150 A | 12/2020 |

*Primary Examiner* — Md N Haque
(74) *Attorney, Agent, or Firm* — Seed Intellectual Property Law Group LLP

(57) ABSTRACT

A method for transmission of monochrome video data of a monochromatic image, wherein three different source monochromatic pixels are encoded by a transmitting device into one compressed three-color pixel; the compressed three-color pixel are transmitted by the transmitting device. The transmitted compressed three-color pixel are received at a receiving device; and the compressed three-color pixel decoding are decoded by the receiving device into three different sink monochromatic pixels. The transmitting device acquires the three different source monochromatic pixels, extracts a single-color value from each of the three different source monochromatic pixels, and generates the compressed three-color pixel using the single-color values extracted from the three different source monochromatic pixels. The receiving device extracts the single-color value from the compressed three-color pixel and associates each of the single-color values extracted from the compressed three-color pixels to a respective pixel of the three different sink monochromatic pixels.

17 Claims, 4 Drawing Sheets

(56)  References Cited

U.S. PATENT DOCUMENTS

| | | | | |
|---|---|---|---|---|
| 2002/0051259 A1* | 5/2002 | Yasunobu | ................ | H04N 1/46 |
| | | | | 358/518 |
| 2009/0003441 A1* | 1/2009 | Sekiguchi | ............ | H04N 19/436 |
| | | | | 375/240.13 |
| 2009/0147112 A1* | 6/2009 | Baldwin | ................ | H04N 23/11 |
| | | | | 348/E5.091 |
| 2017/0162102 A1* | 6/2017 | Liu | ...................... | G09G 3/2074 |
| 2017/0344776 A1* | 11/2017 | Sharma | ............ | G06K 19/06112 |
| 2018/0041757 A1* | 2/2018 | Liu | ...................... | H04N 19/186 |
| 2023/0196790 A1* | 6/2023 | Philipp | ................. | G06V 10/25 |
| | | | | 382/103 |
| 2023/0239582 A1* | 7/2023 | Berkovich | ............ | H04N 25/00 |
| | | | | 348/272 |

* cited by examiner

METHOD AND SYSTEM FOR EFFICIENT TRANSMISSION OF MONOCHROME VIDEO DATA, IN PARTICULAR FOR LASER BEAM SCANNING APPLICATIONS

BACKGROUND

Technical Field

The present disclosure relates to a method and a system for efficient transmission of monochrome video data, in particular for laser beam scanning (LBS) applications.

Description of the Related Art

As is known, Laser Beam Scanning, LBS, has been proposed in a growing number of applications, such as augmented reality (AR) and virtual reality (VR), for example for projecting images in AR/VR headset, pattern images for 3D (three-dimensional) sensing, and images for automotive applications.

LBS applications generally use an application processor as a video content source. The images to be projected are transmitted to a projection system including controlling circuitry for an optical engine, including, e.g., a laser projector.

A simplified block diagram of an exemplary projecting system 1 usable in LBS applications is shown in FIG. 1.

Projecting system 1 includes an image transmitting part 2; an image receiving part 3; and a projection unit 4.

Image transmitting part 2 is configured to manage acquisition of images, storing images and transmitting images to image receiving part 3.

Image transmitting part 2 includes an application processor 12 that may be a microcontroller (MCU-Microcontroller Unit) and includes a central processing unit (CPU) 6 and a memory 8.

Application processor 12 may be physically or wirelessly connected to an external image generation unit (not shown) or include an internal image generation unit (not shown).

Memory 8 may be an embedded memory and is configured to store images to be projected (at least partially) by projection unit 4. Images are generally stored as a matrix of pixels, each pixel being associated to three color values.

Application processor 12 is coupled to receiving part 3 through a communication control line 10 and a data line 11. Control line 10 and data line 11 may be physical or wireless.

Image receiving part 3 is configured to receive the images sent by the image transmitting part 2 and to control projection unit 4.

To this end, image receiving part 3 includes a projection control unit 13 that includes a communication controller 15, for example a microcontroller (μC), a video controller 16, for example implemented as a field programmable gate array (FPGA); a laser driver 17 and a mirror driver 18.

Laser driver 17 is coupled to a plurality of lasers 20, for generating three-chromatic or mono-chromatic light beams; mirror driver 18 is coupled to a mirror 21, for generating scanning of the three-chromatic or mono-chromatic light beams, in a per se known manner.

Here, communication controller 15 is coupled to the application processor 12 through control line 10 and video controller 16 is coupled to the application processor 12 through data line 11.

Communication controller 15, video controller 16, laser driver 17 and mirror driver 18 are coupled together through internal lines, as visible in FIG. 1.

Usual LBS applications provide transmission of video feed at high resolution, for example higher than 1280×720 pixels at a frequency of 60 Hz.

As embedded systems incorporated in mobile devices, it is desired that projecting systems using LBS application have a low consumption and allow transmissions of images between the application processor and the projection control unit in an efficient and low energy way.

Recently, MIPI DSI (Mobile Industry Processor Interface Display Serial Interface) technology has been widely adopted for efficiently transmitting images in mobile applications and now represents a standard in smartphones, laptops, tablets; it is increasingly adopted also in cameras, industrial electronics, Internet-of-Things (IoT), augmented and virtual reality, automotive, and medical technologies.

However, adoption of the MIPI DSI standard may be sometimes not efficient. In fact, some MIPI DSI peripherals support only three-color (RGB) pixel (the data processing interface, DPI, does not support byte packets); in addition, some devices have a limitation in the lane speed.

Therefore, when the images to be transmitted are monochromatic, standard transmission according to the MIPI DSI technology may not be efficient and cause a wasted bandwidth.

In case of a high clock system, unjustified power consumption may result; in some cases, when a lane speed limitation is present, the system is even unable to transmit the images.

Transmission of images as MIPI DSI raw data packets in a non-video mode is sometimes feasible; but this solution is not a standard for video communications and is not widely supported by some application processors and associated video controllers in the projection control unit.

BRIEF SUMMARY

Embodiments of the present disclosure overcome at least some of the drawbacks and limitations of the prior art and provide an efficient transmission of monochromatic image data.

Some embodiments of the present disclosure provide a method, a transmitting device, a receiving device and a system for transmission of monochrome video data.

In some embodiments, a method for transmission of monochrome video data of a monochromatic image includes encoding, at a transmitting device, three different source monochromatic pixels into one compressed three-color pixel and transmitting, by the transmitting device, the compressed three-color pixel. The method includes receiving, by a receiving device, the compressed three-color pixel and decoding, by the receiving device, the compressed three-color pixel into three different sink monochromatic pixels.

In some embodiments, a transmitting device in a system for transmission of monochrome video data includes an encoding unit configured to encode three different source monochromatic pixels into one compressed three-color pixel and an MIPI DSI transmitting unit configured to transmit the compressed three-color pixel.

A receiving device in a system for transmission of monochrome video data includes a MIPI receiving unit configured to receive a compressed three-color pixel and a decoding unit configured to decode the received compressed three-color pixel into three different sink monochromatic pixels.

In some embodiments, a system for transmission of monochrome video data includes a transmitting device and a receiving device. The transmitting device includes an encoding unit configured to encode three different source monochromatic pixels into one compressed three-color pixel and an MIPI DSI transmitting unit configured to transmit the compressed three-color pixel. The receiving device includes a MIPI receiving unit configured to receive a compressed three-color pixel and a decoding unit configured to decode the received compressed three-color pixel into three different sink monochromatic pixels.

BRIEF DESCRIPTION OF THE SEVERAL VIEWS OF THE DRAWINGS

For the understanding of the present invention, embodiments thereof are now described, purely as a non-limitative example, with reference to the enclosed drawings, wherein.

DETAILED DESCRIPTION

Figure 2:
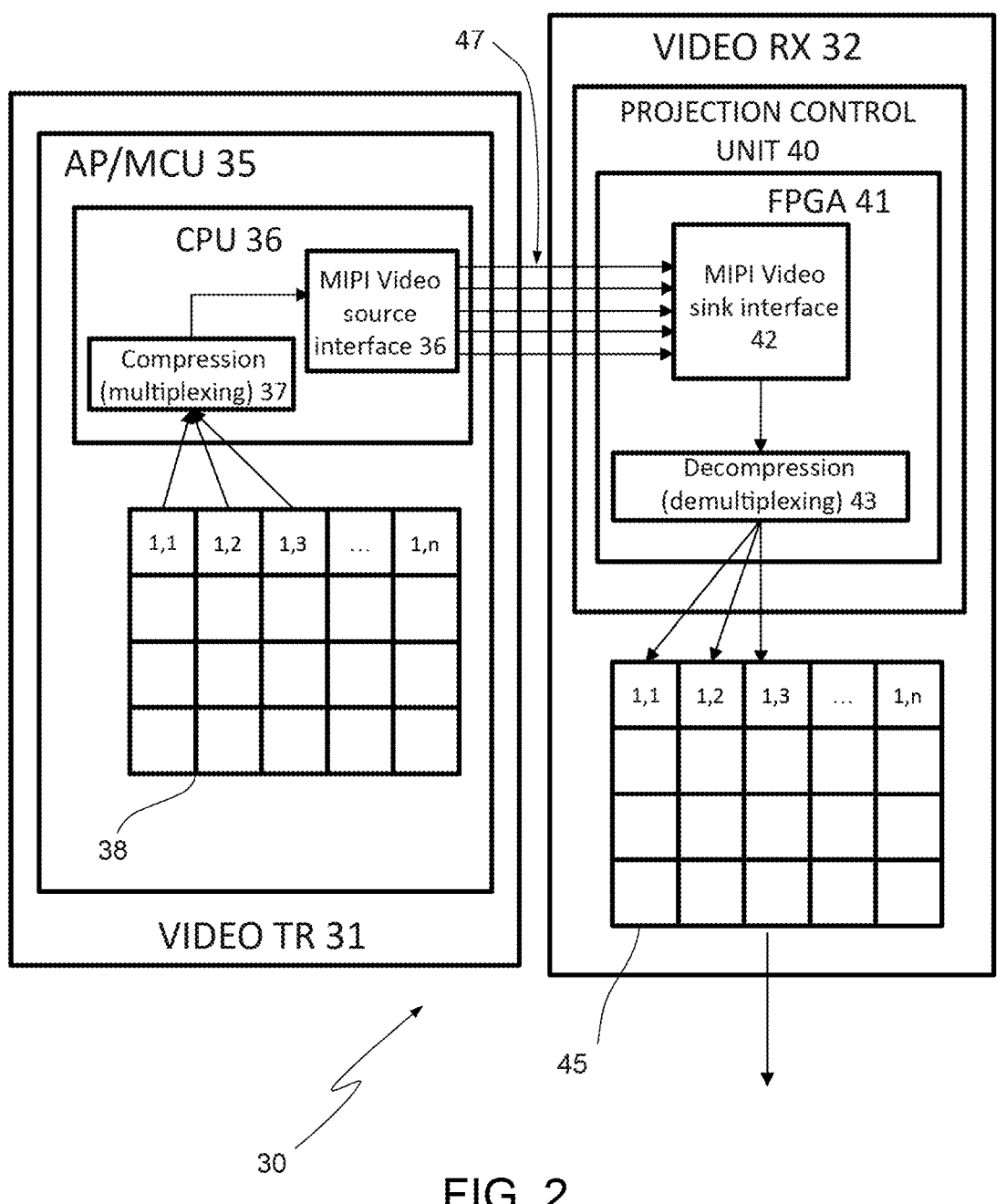
FIG. 2 is simplified block diagram of a portion of a projecting system according to an embodiment.

FIG. 2 shows a projecting system 30 according to an embodiment.

Projecting system 30 has an image transmitting part 31 and an image receiving part 32. A projection unit (not shown) may be included in projecting system 30, analogously to projection unit 4 of FIG. 1.

Figure 1:
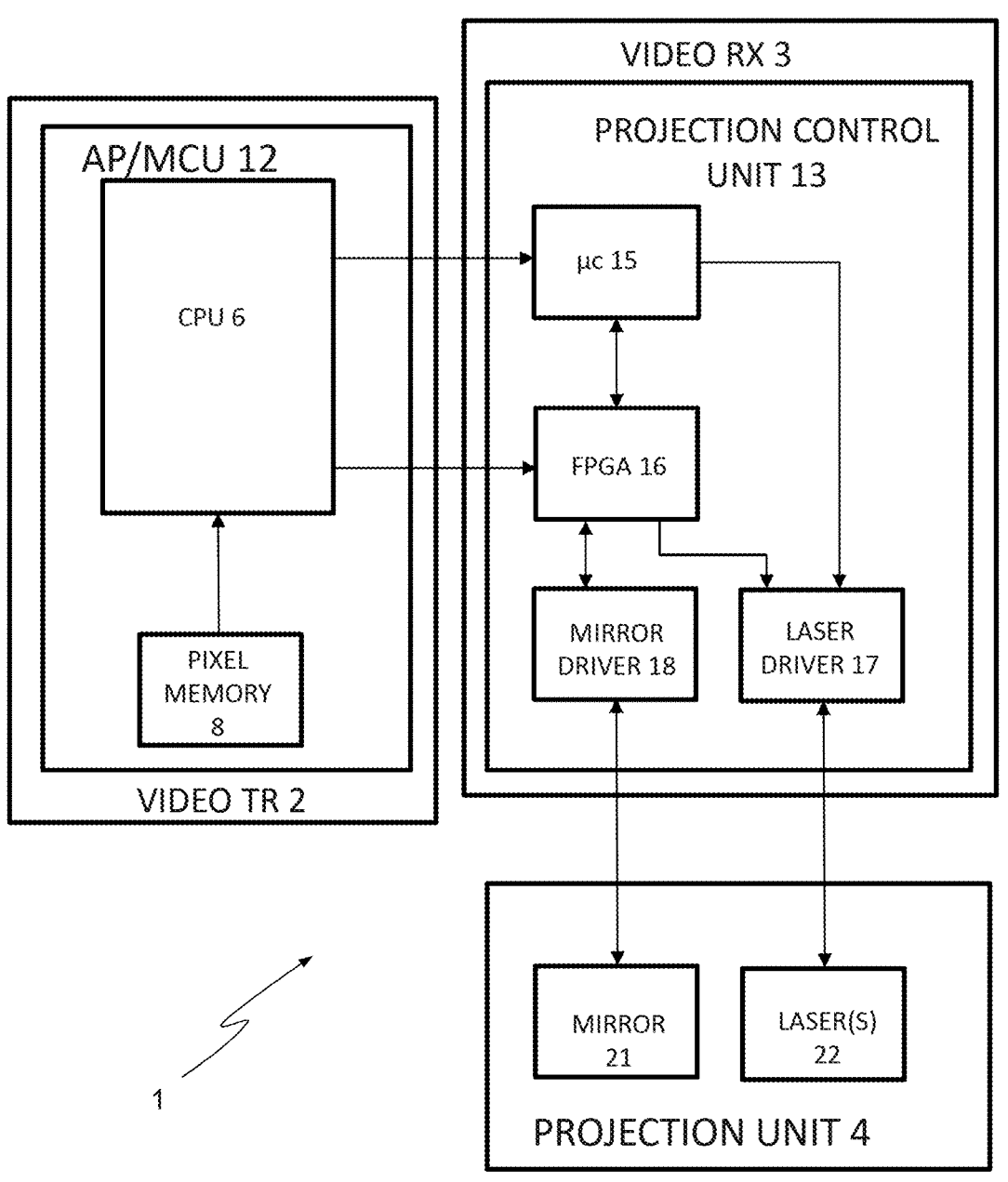
FIG. 1 is simplified block diagram of a projecting system 1 usable in LBS applications.

Image transmitting part 31 and image receiving part 32 may have general structures as parts 2, 3 shown in FIG. 1. However, parts not relevant for the following description have not been shown.

Image transmitting part 31 includes an application processor 35 that may be a microcontroller (MCU-Microcontroller Unit) and includes a central processing unit (CPU) 36 and a first memory 38.

Application processor 35 includes circuitry configured to acquire images and to store them in first memory 38, analogously to application processor 12 of FIG. 1.

Application processor 35 may be thus physically or wirelessly connected to an external image generation unit (not shown) or include an internal image generation unit (not shown).

CPU 36 is configured to manage transmission of the images stored in memory 38 to the image receiving part 32. To this end, CPU 36 includes an MIPI DSI video source interface 36 and a compression unit 37, as discussed in detail hereinbelow.

Memory 38 may be an embedded memory and is configured to store images to be projected (at least partially) by projecting system 30. Images are generally stored as matrices of pixels, each pixel being associated to three color values.

Image receiving part 32 includes a projection control unit 40 including a video controller 41, for example implemented through a field programmable gate array (FPGA).

FPGA 41 implements a MIPI DSI video sink interface 42 and a decompression unit 43 and is connected to a second memory 45.

Image transmitting part 31 and image receiving part 32 are coupled together through a connection channel 47 that may be any physical layer, according to the MIPI DSI standard.

Projecting system 30 is able to manage projection of monochromatic images in an efficient way, using standard image transmission resources, exploiting the MIPI DSI standard.

As indicated, standard MIPI DSI systems are configured to transmit/receive three-color pixels and are not optimized for transmission/receipt of monochromatic pixels, wasting bandwidth and energy.

To solve this issue, projecting system 30 manages transmission/receipt of monochromatic images by compressing pixels to be transmitted and decompressing them before projection.

To this end, projecting system 30 extracts a single color value from each pixel; generates a new three-dimensional pixel (also called hereinafter "pseudo-pixel") from the single color values of three different pixels through the compression unit 37; and transmits the three-color pseudo-pixel through the MIPI DSI video source interface 36, the connection channel 47 and the MIPI DSI video sink interface 42.

MIPI DSI video source interface 36, connection channel 47 and MIPI DSI video sink interface 42 may be thus standard components.

The three-dimensional pseudo-pixels received at the image receiving part 32 are decompressed at the decompression unit 43, by generating, from each three-dimensional pseudo-pixel, three different monochromatic pixels. The decompressed monochromatic pixels may be stored in second memory 45 (ordered according to their sequence in the first memory 38) for their projection, as described for projection system 1 of FIG. 1.

Pixels from the first memory 38 may be adjacent pixels along a row or a column of the matrix and be ordered in second memory 45 in the same row or column order.

Figure 3:
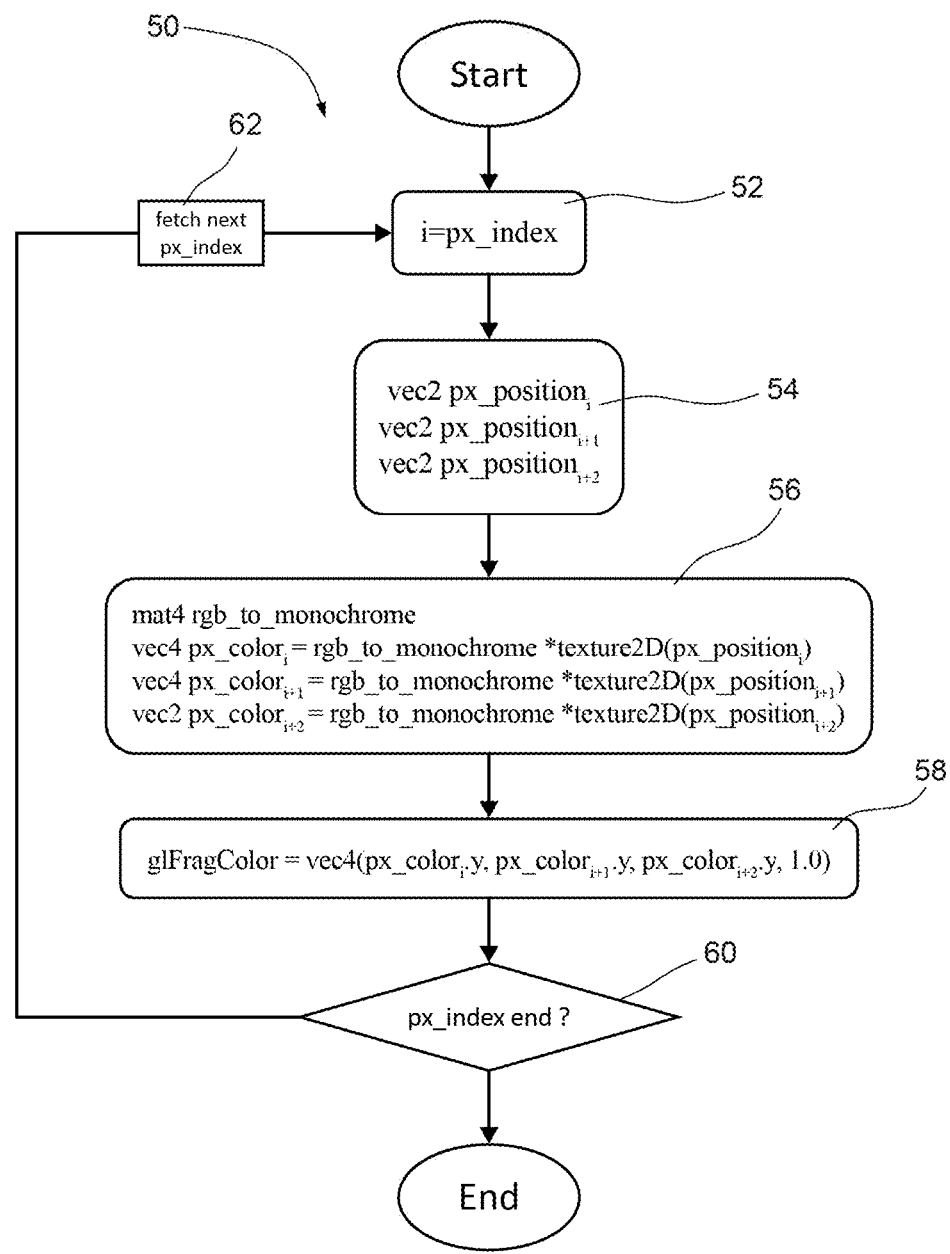
FIG. 3 is a flow-chart showing steps in video transmission of the projecting system of FIG. 2, according to an embodiment.

A possible process 50 performed by compression unit 37 of application processor 35 is shown in FIG. 3, wherein, for simplicity of description, sequential (serial) processing of the pixel of an image is described.

However, generally, application processor 35 operates in a high parallel way, processing all or a significant part of the pixels of an image in parallel. Thus, the sequential processing shown in FIG. 3 is not to be considered limitative.

In the description below, the following definitions apply:

Three-color pixel: a standard image pixel represented by a set of three color values (RGB);

Single color value: a value extracted from the three-color pixel of a monochromatic image and indicative of the mono-chromatic information (for example, a single-color value associated to one color, e.g., green G, or any value derived from processing, e.g., averaging, the three-color pixel), that may be re-converted into a standard three-color pixel;

Compressed pixel: a set of three single-color values extracted from three different three-color pixels.

With reference to FIG. 3, step 52, a counter i is initialized at pixel index (px_index).

In step 54, the position of pixel i and two consecutive pixels i+1 and i+2 are acquired and saved in a position vector vec2 inside CPU 36.

In step 56, single-color values of pixels i, i+1 and i+2 is extracted, for example by multiplying, by an extraction matrix, the tree-color pixels whose position is saved in vector vec2; the result is saved in value vector vec4 inside CPU 36.

In step 58, a compressed pixel is generated as including the single-color values of pixels i, i+1 and i+2.

In step 60, check of processing of an entire image is done; if not all the pixels have been processed, output N from step 60, the flow progresses to step 62, to fetch a subsequent pixel index and go to step 50, above described.

If all pixels have been extracted, output Y from step 60, the process ends.

Figure 4:
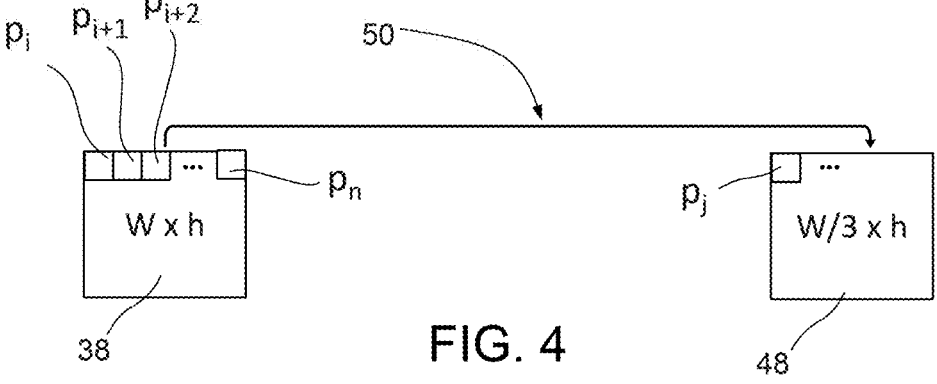
FIG. 4 is a representation of the memory space compression in the transmitting part of the projecting system of FIG. 2.
Figure 5:
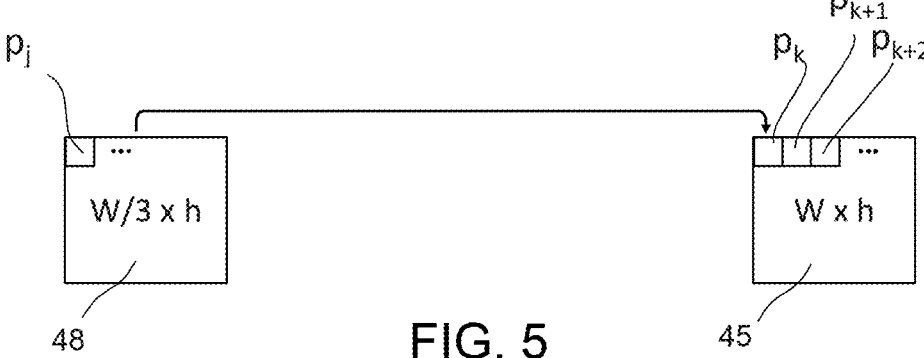
FIG. 5 is a representation of the memory space compression in the receiving part of the projecting system of FIG. 2.

The result is also represented conceptually in FIG. 4, showing first memory 38 including a plurality of pixels $p_i$, $p_{i+1}$, $p_{i+2}$, . . . $p_n$, each storing three color values; processing of pixels $p_i$, $p_{i+1}$, $p_{i+2}$ by process 50 and a resulting memory 47 (embedded in application processor 35) having the compressed pixel $p_j$ containing the same information as pixels $p_i$, $p_{i+1}$, $p_{i+2}$ of first memory 38 but stored in a single location.

Therefore, assuming that first memory 38 has a width W and a height h (total dimension: W×h), pixel memory 48 may have a total dimension (W×h)/3, for example a width W/3 and a height h (or same width W and a height h/3 or any other combination having the above total dimension).

Memory 48 may not be a physical one, but an abstraction of the data stream.

Decompression at decompression unit 43 of the projection control unit 40 may be the opposite of process 50: in particular, with reference to FIG. 6, decompression unit 43 may:

extract the first color value of compressed pixel $p_j$;

process the first color value of compressed pixel $p_j$ to obtain a first set of decompressed three-color values and associate them to a decompressed pixel $p_k$;

extract the second color value of compressed pixel $p_j$;

process the second color value of compressed pixel $p_j$ to obtain a second set of decompressed three-color values and associate them to a decompressed pixel $p_{k+1}$;

extract the third color of compressed pixel $p_j$; and process the third color value of compressed pixel $p_j$ to obtain a third set of decompressed three-color values and associate them to a decompressed pixel $p_{k+2}$.

By virtue of the compression of an image in compressed pixels having an informative content that is tripled with respect to the original image, it is possible to use the standard MIPI DSI transmission technique with optimization of the bandwidth used for transmission.

In addition, also devices having MIPI DSI clock speed limitations may be able to be used.

The system has a lower resource occupation and lower power.

In addition, adaptation of existing architectures simply involves the implementation of the compression and decompression units 36, 43, that is with minimal change in the application processor 35 and in the video controller 41.

Finally, it is clear that numerous variations and modifications may be made to the system and method described and illustrated herein, all falling within the scope of the present disclosure as defined in the attached claims.

In some embodiments, a method for transmission of monochrome video data of a monochromatic image, includes encoding, at a transmitting device (31), three different source monochromatic pixels into one compressed three-color pixel; transmitting, by the transmitting device, the compressed three-color pixel; receiving, by a receiving device (32), the compressed three-color pixel; and decoding, by the receiving device, the compressed three-color pixel into three different sink monochromatic pixels.

In some embodiments, encoding includes acquiring the three different source monochromatic pixels, each source monochromatic pixel being associated to three-color values; extracting a single-color value from each of the three different source monochromatic pixels; and generating the compressed three-color pixel using the single-color values extracted from the three different source monochromatic pixels.

In some embodiments, decoding includes extracting the single-color value from the compressed three-color pixel; and associating each of the single-color values extracted from the compressed three-color pixels to a respective pixel of the three different sink monochromatic pixels.

In some embodiments, three different source monochromatic pixels are first three different source monochromatic pixels of the monochromatic image and encoding further includes: acquiring three different further source monochromatic pixels in the monochromatic image, each further source monochromatic pixel being associated to respective three color values; extracting a single-color value from each of the three different further source monochromatic pixels; and generating a further compressed three-color pixel using the single-color values extracted from the three different further source monochromatic pixels.

In some embodiments, three different further source monochromatic pixels are processed in parallel with the first three different source monochromatic pixels.

In some embodiments, transmitting includes using the RGB MIPI DSI protocol.

In some embodiments, the method includes three different source monochromatic pixels are adjacent pixels in the monochromatic image.

In some embodiments, the monochromatic image includes a matrix of pixels arranged in a plurality of rows and a plurality of columns, wherein the adjacent pixels in the monochromatic image may be adjacent pixels in a row of the plurality of rows or adjacent pixels in a column of the plurality of columns.

In some embodiments, a transmitting device (31) in a system (30) for transmission of monochrome video data, includes an encoding unit (37) configured to encode three different source monochromatic pixels into one compressed three-color pixel; and an MIPI DSI transmitting unit (36) configured to transmit the compressed three-color pixel.

In some embodiments, the encoding unit (37) is configured to: acquire the three different source monochromatic pixels, each source monochromatic pixel being associated to three-color values; extract a single-color value from each of the three different source monochromatic pixels; and generate the compressed three-color pixel using the single-color values extracted from the three different source monochromatic pixels.

In some embodiments, three different source monochromatic pixels are first three different source monochromatic pixels of the monochromatic image and the encoding unit (37) is further configured to: acquire three different further source monochromatic pixels in the monochromatic image, each further source monochromatic pixel being associated to respective three color values; extract a single-color value from each of the three different further source monochromatic pixels; and generate a further compressed three-color pixel using the single-color values extracted from the three different further source monochromatic pixels.

In some embodiments, three different further source monochromatic pixels are processed in parallel with the first three different source monochromatic pixels.

In some embodiments, a receiving device (32) in a system (30) for transmission of monochrome video data, includes a MIPI receiving unit (42) configured to receive a compressed three-color pixel; and a decoding unit (43) configured to decode the received compressed three-color pixel into three different sink monochromatic pixels.

In some embodiments, the decoding unit is configured to: extract a first color of the received compressed three-color pixel $p_j$; associate the extracted first color to a first sink monochromatic pixel $p_k$ of the three different sink mono-chromatic pixels; extract a second color of the received three-color pixel $p_j$; associate the extracted second color to a second sink monochromatic pixel $p_{k+1}$ of the three different sink monochromatic pixels; extract a third color of the received three-color pixel $p_j$; and associate the extracted third color to a third sink monochromatic pixel $p_{k+2}$ of the three different sink monochromatic pixels.

A system (30) for transmission of monochrome video data includes the transmitting device (31) and the receiving device (32).

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for transmission of monochrome video data of a monochromatic image, comprising:

encoding, at a transmitting device, three source mono-chromatic pixels into one compressed three-color pixel;

transmitting, by the transmitting device, the compressed three-color pixel;

receiving, by a receiving device, the compressed three-color pixel; and decoding, by the receiving device, the compressed three-color pixel into three sink monochromatic pixels;

acquiring the three source monochromatic pixels, each source monochromatic pixel being associated to three-color values;

extracting a single-color value from each of the three source monochromatic pixels; and generating the compressed three-color pixel using the single-color values extracted from the three source monochromatic pixels.

2. The method of claim 1, wherein decoding the com-pressed three-color pixel includes:

extracting the single-color value from the compressed three-color pixel; and associating each of the single-color values extracted from the compressed three-color pixels to a respective pixel of the three sink monochromatic pixels.

3. The method of claim 1, wherein the three source monochromatic pixels are first three source monochromatic pixels of the monochromatic image and wherein encoding further includes:

acquiring three further source monochromatic pixels in the monochromatic image, each further source mono-chromatic pixel being associated to respective three color values;

extracting a single-color value from each of the three further source monochromatic pixels; and generating a further compressed three-color pixel using the single-color values extracted from the three further source monochromatic pixels.

4. The method of claim 3, wherein the three further source monochromatic pixels are processed in parallel with the first three source monochromatic pixels.

5. The method of claim 1, wherein transmitting includes using the RGB MIPI DSI protocol.

6. The method of claim 1, wherein the three source monochromatic pixels are adjacent pixels in the monochro-matic image.

7. The method of claim 1, wherein the monochromatic image comprises a matrix of pixels arranged in a plurality of rows and a plurality of columns, wherein the adjacent pixels in the monochromatic image are adjacent pixels in a row of the plurality of rows or adjacent pixels in a column of the plurality of columns.

8. The method of claim 1, wherein the receiving device is coupled to a projection unit.

9. A transmitting device in a system for transmission of monochrome video data, comprising:

an encoding unit configured to encode three source mono-chromatic pixels into one compressed three-color pixel; and an MIPI DSI transmitting unit configured to transmit the compressed three-color pixel, wherein the encoding unit is configured to:

acquire the three source monochromatic pixels, each source monochromatic pixel being associated to three-color values;

extract a single-color value from each of the three source monochromatic pixels; and generate the compressed three-color pixel using the single-color values extracted from the three source monochromatic pixels.

10. The transmitting device of claim 9, wherein the three source monochromatic pixels are first three source mono-chromatic pixels of the monochromatic image and the encoding unit is further configured to:

acquire three further source monochromatic pixels in the monochromatic image, each further source monochro-matic pixel being associated to respective three-color values;

extract a single-color value from each of the three further source monochromatic pixels; and generate a further compressed three-color pixel using the single-color values extracted from the three further source monochromatic pixels.

11. The transmitting device of claim 10, wherein the three further source monochromatic pixels are processed in par-allel with the first three source monochromatic pixels.

12. The transmitting device of claim 9 wherein the encoding unit is a multiplexing unit.

13. The transmitting device of claim 9, comprising a memory configured to store a matrix of pixels.

14. A receiving device in a system for transmission of monochrome video data, comprising:

a MIPI receiving unit configured to receive a compressed three-color pixel; and a decoding unit configured to decode the received com-pressed three-color pixel into three sink monochro-matic pixels, wherein the decoding unit is configured to:

wherein the decoding unit is configured to:

extract a first color of the received compressed three-color pixel $p_j$;

associate the extracted first color to a first sink mono-chromatic pixel $p_k$ of the three sink monochromatic pixels;

extract a second color of the received three-color pixel $p_j$;

associate the extracted second color to a second sink monochromatic pixel $p_{k+1}$ of the three sink monochromatic pixels;

extract a third color of the received three-color pixel $p_j$; and associate the extracted third color to a third sink monochromatic pixel $p_{k+2}$ of the three sink monochromatic pixels.

15. The receiving device of claim 14, wherein the decoding unit is a demultiplexing unit.

16. The receiving device of claim 14, comprising a field programmable gate array.

17. The receiving device of claim 16, wherein the MIPI receiving unit is implemented in the field programmable gate array.

\* \* \* \* \*